(12) United States Patent
Hayashi et al.

(10) Patent No.: US 6,188,524 B1
(45) Date of Patent: Feb. 13, 2001

(54) OPTICAL SYSTEM FOR USE IN AN IMAGE PROJECTOR

(75) Inventors: Kohtaro Hayashi, Toyonaka; Yasumasa Sawai, Sakai; Shunta Takimoto, Nishinomiya; Kenji Konno, Sakai, all of (JP)

(73) Assignee: Minolta Co., Ltd., Osaka (JP)

( * ) Notice: Under 35 U.S.C. 154(b), the term of this patent shall be extended for 0 days.

(21) Appl. No.: 09/244,527

(22) Filed: Feb. 4, 1999

(30) Foreign Application Priority Data

Feb. 27, 1998 (JP) .................................................. 10-046644

(51) Int. Cl.⁷ .............................. G02B 3/00; G02B 15/14; G03B 21/00
(52) U.S. Cl. .......................... 359/651; 359/691; 359/740; 353/31
(58) Field of Search .................................... 359/649–651, 359/691, 740; 353/98, 30–38

(56) References Cited

U.S. PATENT DOCUMENTS 5,552,938 9/1996 Sugawara .............................. 359/691
5,626,409 * 5/1997 Nakayama et al. .................... 353/31
5,969,875 * 10/1999 Sugawara .............................. 359/651

FOREIGN PATENT DOCUMENTS 5-203872   8/1993  (JP) .
6-265842 * 9/1994  (JP) .

* cited by examiner

*Primary Examiner*—Georgia Epps
*Assistant Examiner*—Evelyn A. Lester
(74) *Attorney, Agent, or Firm*—Sidley & Austin

(57) ABSTRACT

A projector optical system has a reflection-type display panel, an illumination optical system for illuminating the reflection-type display panel, and a projection optical system for projecting the images displayed on the reflection-type display panel onto a screen. The projection optical system has, from the screen side, a front lens unit and a rear lens unit. A light-deriving means for directing illumination light toward the reflection-type display panel is disposed between the front and rear lens units. Additionally, the following condition is fulfilled:

$$0.2 < \phi F/\phi < 0.9$$

where $\phi F$ represents the optical power of the front lens unit of the projection optical system, and $\phi$ represents the optical power of the entire projection optical system.

29 Claims, 4 Drawing Sheets

FNO=2.70

-0.5  0.5
SPHERICAL  SINE
ABERRATION  CONDITION

Y'=20.9

-0.5  0.5
ASTIGMATISM

Y'=20.9

-4.0  4.0
DISTORTION %

FNO=2.70

-0.5  0.5
SPHERICAL  SINE
ABERRATION  CONDITION

Y'=20.9

-0.5  0.5
ASTIGMATISM

Y'=20.9

-4.0  4.0
DISTORTION %

EFFECTIVE FNO=2.49

—— d
—·— g
—··— c
----- SC

-0.5    0.5
SPHERICAL SINE
ABERRATION CONDITION

Y'=20.9

----- DM
—— DS

-0.5    0.5
ASTIGMATISM

Y'=20.9

-4.0    4.0
DISTORTION %

OPTICAL SYSTEM FOR USE IN AN IMAGE PROJECTOR

This application is based on application No. H10-046644 filed in Japan, the content of which is hereby incorporated by reference.

BACKGROUND OF THE INVENTION

1. Field of the Invention

The present invention relates to an optical system for use in an image projector (hereafter such an optical system will be referred to as a "projector optical system"), and more particularly to a projector optical system for use in an image projection apparatus (such as a liquid crystal projector) for projecting an image from a reflection-type display panel (such as a reflection-type liquid crystal panel) onto a screen.

2. Description of the Prior Art

As a method for achieving appropriate illumination in a projector optical system of the type that projects the image displayed on a reflection-type display panel onto a screen, U.S. Pat. No. 5,552,938 and Japanese Laid-Open Patent Application No. H5-203872 propose directing the light for illumination to the reflection-type display panel by the use of a polarized-light separating prism disposed in the position of the aperture stop of the projector optical system. FIG. 5 shows the outline of the structure of such a projector optical system. This projector optical system is provided with a projection optical system and an illumination optical system. The projection optical system is composed of a front lens unit (GrF), a polarized-light separating prism (Pr2), an aperture stop (A), and a rear lens unit (GrR). The illumination optical system is composed of a condenser lens (CL).

The light beam from a light source (1) is formed into a substantially parallel beam by a reflector (2), and is then condensed by the condenser lens (CL) so as to form an image of the light source. The light source (1), the reflector (2), the condenser lens (CL), and the polarized-light separating prism (Pr2) are so arranged that the image of the light source is formed in the position of the aperture stop (A). Thus, this structure conforms to that of the so-called Koehler illumination. Of the light beam that is condensed to form the image of the light source, only the S-polarized light component is reflected by the polarized-light separating prism (Pr2). The light beam reflected from the polarized-light separating prism (Pr2) then passes through the rear lens unit (GrR), and then enters a color separating/integrating prism (Pri), where the light beam is separated into three light beams of different colors so as to illuminate the display surfaces of three reflection-type display panels (PR, PG, and PB) individually, with each light beam illuminating the entire display surface of the corresponding display panel.

Since these display panels (PR, PG, and PB) employ reflection-type liquid crystal panels, the light beam that illuminates each of the display panels (PR, PG, and PB) is, when reflected therefrom, partially P-polarized and partially S-polarized according to the pattern formed by the pixels of the display panel. The light beams reflected from the individual display panels are then, by the color separating/integrating prism (Pr1), integrated into a single light beam to be projected (hereafter referred to as the "projection light beam"), which then passes through the rear lens unit (GrR). Thereafter, of this projection light beam, only the P-polarized light component is allowed to pass through the polarized-light separating prism (Pr2). Here, note that the front lens unit (GrF) is designed to be substantially afocal so that the rays from around the center of each of the display panels (PR, PG, and PB) pass through the polarized-light separating prism (Pr2) as a nearly parallel beam. After passing through the polarized-light separating prism (Pr2), the projection light beam passes through the front lens unit (GrF), and then forms a display image on a screen (S).

The method, as adopted in the above-described conventional example, that uses a polarized-light separating prism (Pr2) to select and project, out of the light beam reflected from each display panel (PR, PG, or PB), only the light component obtained from a particular polarizing surface suffers from low contrast in the projected image (hereafter referred to as the "projection contrast") because of the disturbance of the polarizing surface caused by slight double refraction and the like occurring in the lens elements constituting the rear lens unit (GrR). The projection contrast tends to be lower the greater the number of constituent lens elements of the rear lens unit (GrR). Accordingly, by reducing the number of constituent lens elements of the rear lens unit (GrR), it is possible to prevent degradation of the projection contrast, but this simultaneously makes it difficult to obtain satisfactory optical performance.

SUMMARY OF THE INVENTION

An object of the present invention is to provide a projector optical system that offers satisfactory optical performance despite having a projection optical system with a rear lens unit composed of as few lens elements as possible.

To achieve the above object, according to one aspect of the present invention, a projector optical system is provided with a reflection-type display panel, an illumination optical system for illuminating the reflection-type display panel, and a projection optical system for projecting the images displayed on the reflection-type display panel onto a screen. The projection optical system is composed of, from the screen side, a front lens unit and a rear lens unit. A light-deriving means for directing illumination light toward the reflection-type display panel is disposed between the front and rear lens units. Additionally, the following condition is fulfilled:

$$0.2 < \phi F/\phi < 0.9$$

where $\phi F$ represents the optical power of the front lens unit of the projection optical system; and $\phi$ represents the optical power of the entire projection optical system.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
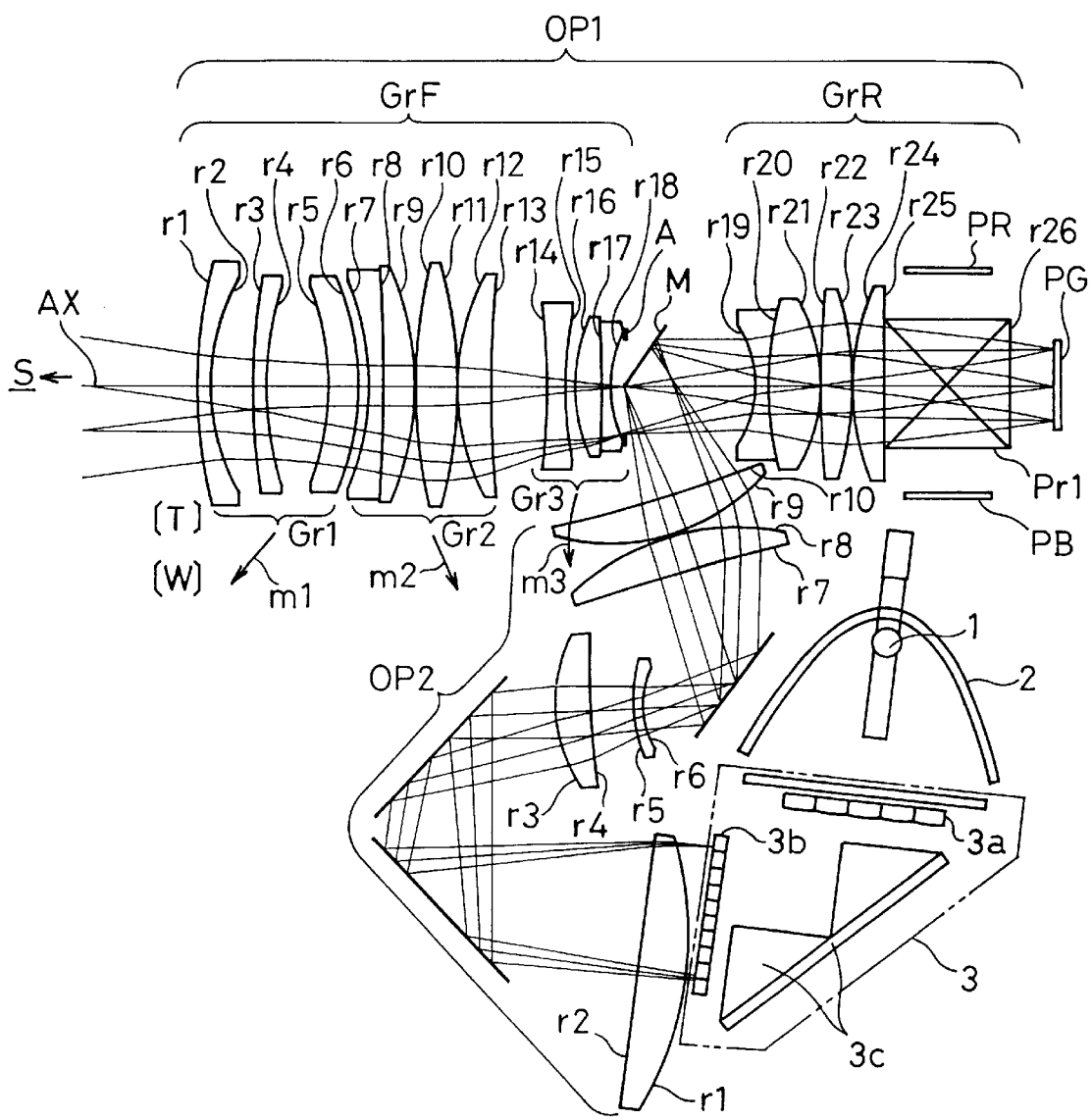
FIG. 1 is an optical arrangement diagram of the projector optical system of a first embodiment (Example 1) of the present invention.
Figure 3:
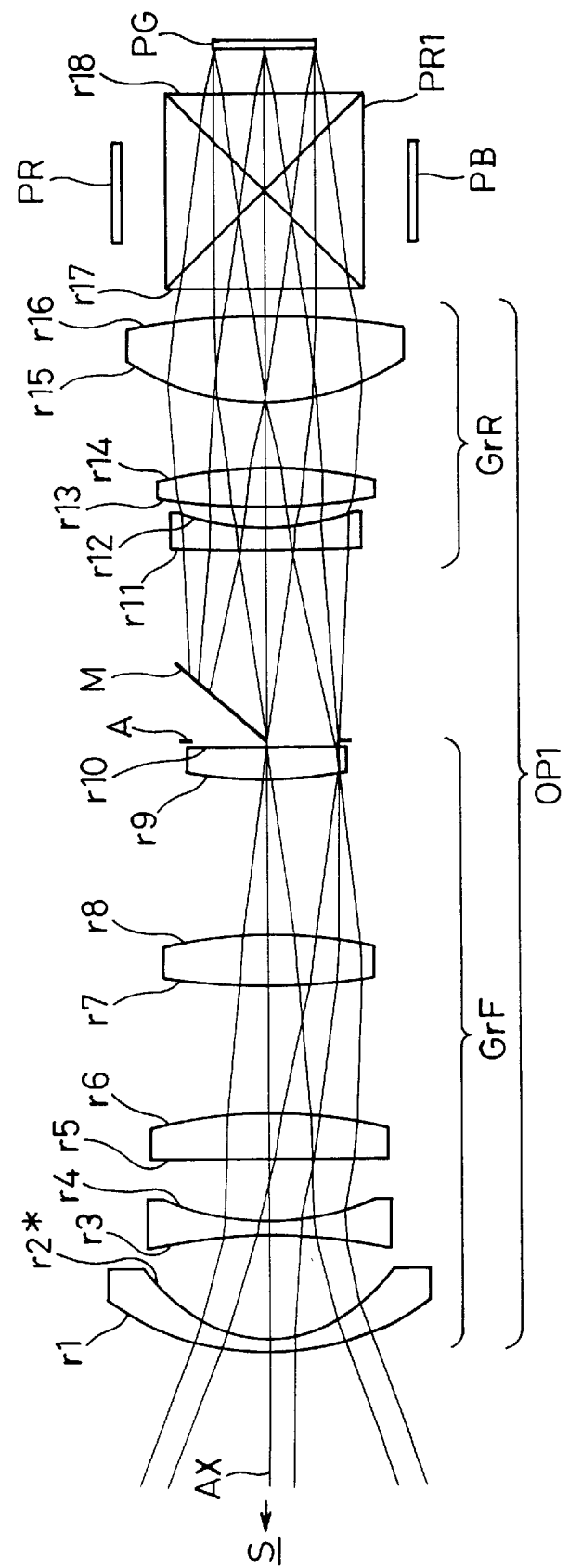
FIG. 3 is an optical arrangement diagram of the projector optical system of a second embodiment (Example 2) of the present invention.

Hereinafter, projector optical systems embodying the present invention will be described with reference to the accompanying drawings. FIGS. 1 and 3 are optical arrangement diagrams of the projector optical systems of a first and a second embodiment, respectively, of the present invention. In the first embodiment, the projector optical system employs a zoom lens system as its projection optical system (OP1). On the other hand, in the second embodiment, the projector optical system employs a fixed-focal-length lens system as its projection optical system (OP1). In other respects, the projector optical systems of the first and second embodiments have the same arrangement, and therefore, in FIG. 3, the illumination optical system and components other than the projection optical system are omitted.

FIG. 1 illustrates the lens arrangement of the projection optical system (OP1) provided in the projector optical system of the first embodiment, as observed in the telephoto-end condition [T]. In FIG. 1, arrow mj (j=1, 2, 3) schematically indicates the movement of the jth lens unit (Grj) during zooming from the telephoto end (the longest-focal-length condition) [T] to the wide-angle end (the shortest-focal-length condition) [W]. Moreover, in the projection optical system (OP1) of the projector optical system of each embodiment, a surface marked with ri (i=1, 2, 3, . . . ) is the ith surface counted from the enlargement side (i.e. the screen (S) side), a surface ri marked with an asterisk (*) is an aspherical surface. Furthermore, in the illumination relay optical system (OP2) of the projector optical system of the first embodiment, a surface marked with ri (i=1, 2, 3, . . . ) is the ith surface counted from the integrator (3) side.

First Embodiment (FIG. 1)

The projector optical system of the first embodiment is designed for use in an image projection apparatus of a forward-projection type (front type), and has an illumination optical system for illuminating reflection-type display panels (PR, PG, and PB) and a projection optical system (OP1) for projecting the images displayed on those reflection-type display panels (PR, PG, and PB) onto a screen (S). The projection optical system (OP1) is composed of, from the screen (S) side, a front lens unit (GrF), an aperture stop (A), and a rear lens unit (GrR); in addition, in the projection optical system (OP1), a reflection mirror (M) serving as a light-deriving means for directing illumination light toward the reflection-type display panels (PR, PG, and PB) is disposed between the front lens unit (GrF) with the aperture stop (A), on one side, and the rear lens unit (GrR), on the other. This reflection mirror (M) is disposed in the vicinity of the aperture stop (A) of the projection optical system (OP1) so as to cover about a half of the aperture diameter. The illumination optical system is composed of an integrator (3) of a lens-array type having a first and a second lens array (3a and 3b) therein, and an illumination relay optical system (OP2) having five lens elements and three reflection mirrors therein. The integrator (3) forms a plurality of light source images. The illumination relay optical system (OP2) forms, through the reflection mirror (M), images conjugate with the light source images within the projection optical system (OP1).

The light beam emitted from a light source (1) is formed into a substantially parallel light beam by a reflector (2), and is then formed into a light source image on the second lens array (3b) of the integrator (3). To achieve effective use of the light source (1), the integrator (3) has a polarized-light conversion optical system (3c) disposed between the first and second lens arrays (3a and 3b) thereof (for details, refer to U.S. patent application Ser. No. 08/749,887). This light source image is re-focused in the vicinity of the reflection mirror (M) by the illumination relay optical system (OP2). The light beam reflected from the reflection mirror (M) passes through the aperture stop (A), and immediately enters the projection optical system (OP1). Thereafter, the light beam passes through the rear lens unit (GrR) and is then directed to a color separating/integrating prism (Pr1) so as to be subjected to color separation (i.e. white illumination light is separated into red, green, and blue light components). As a result, the display surface of each of the three reflection-type display panels (PR, PG, and PB) is illuminated with light of a different one of those three colors. At this time, the color separating/integrating prism (Pr1) lets the green light component pass straight along the optical axis and simultaneously reflects the red and blue light components in opposite directions, with the result that, the red, green, and blue light components are reflected by the display panels for red light, green light, and blue light (PR, PG, and PB), respectively.

On reaching the reflection-type display panels (PR, PG, and PB), the illumination light is reflected in accordance with the patterns of the pixels formed by the individual display panels. In a case where reflection-type liquid crystal panels are employed as the reflection-type display panels (PR, PG, and PB), the liquid crystal panels are each fitted with a polarized-light filter immediately in front of them so as to act as LCD (Liquid crystal display) panels that reflect only a light component whose polarizing surface is not changed by liquid crystal. The light beams reflected from the display panels (PR, PG, and PB) are directed to the color separating/integrating prism (Pr1) so as to be integrated into a single projection light beam. The projection light beam thus obtained first passes through the rear lens unit (GrR), and then, at the position of the aperture stop (A) where the reflection mirror (M) is disposed, passes through the other half of the aperture stop that is not covered by the reflection mirror (M). Thus, the projection light beam that has passed through the aperture stop (A) without striking the reflection mirror (M) forms, through the front lens unit (GrF), a display image on the screen (S).

The projection optical system (OP1) is built as a zoom lens system that is telecentric toward the reduction side (i.e. toward the display panels (PR, PG, and PB)) and that performs zooming by moving only the front lens unit (GrF). The front lens unit (GrF) is composed of, from the screen (S) side, a first lens unit (Gr1) having a negative optical power, a second lens unit (Gr2) having a positive optical power, and a third lens unit (Gr3) having a negative optical power. In this front lens unit (GrF), as indicated by arrows m1 to m3, zooming is achieved by moving these lens units (Gr1 to Gr3) along the optical axis (AX); focusing is achieved by moving the first lens unit (Gr1) included in the front lens unit (GrF) along the optical axis (AX). The lens units that are moved for zooming or focusing are all included in the front lens unit (GrF) disposed on the screen (S) side of the aperture stop (A). This is to keep the projection optical system (OP1) telecentric over the entire zooming and focusing ranges. In this embodiment, where illumination light is derived from the vicinity of the aperture stop (A), it is essential to keep the projection optical system (OP1) telecentric in order to eliminate uneven distribution of light on the display panels (PR, PG, and PB) and to allow the light beams reflected from the display panels (PR, PG, and PB) to pass properly through the aperture stop (A) without striking the mirror (M) disposed in the vicinity thereof.

Figure 5:
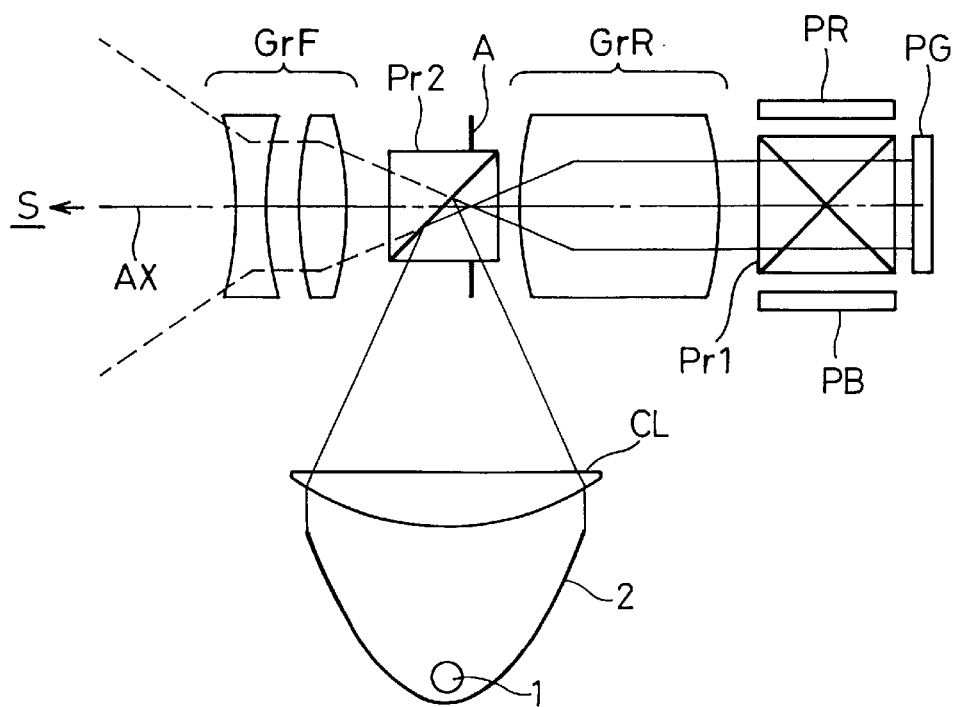
FIG. 5 is an optical arrangement diagram of a conventional example of a projector optical system.

In the projector optical system of this embodiment, illumination light is derived in a different manner from in the previously-described conventional example (FIG. 5) employing the polarized-light separating prism (Pr2). However, even in the rear lens unit (GrR) of this embodiment, if a relatively large number of constituent lens elements are used, the illumination light directed from the reflection mirror (M) to the display panels (PR, PG, and PB) tend to be reflected more easily on the lens surfaces. This causes flare on the screen (S) and thereby degrades the contrast. To overcome this problem, it is preferable that Condition (I) below be fulfilled.

$$0.2<\phi F/\phi<0.9 \qquad (I)$$

where $\phi F$ represents the optical power of the front lens unit (GrF) of the projection optical system (OP1) (i.e., the total optical power available on the screen (S) side of the position from which illumination light is derived); and $\phi$ represents the optical power of the entire projection optical system (OP1).

If Condition (I) is fulfilled, by reducing the number of lens elements constituting the rear lens unit (GrR), it is possible to keep sufficient optical performance and simultaneously suppress the flare and the like that occur when the illumination and projection light beams pass through the rear lens unit (GrR), and thereby obtain high projection contrast. If the optical power of the front lens unit (GrF) is so weak relative to that of the entire projection optical system (OP1) that the lower limit of Condition (I) is exceeded, the rear lens unit (GrR) needs to be responsible for an unduly large proportion of the optical power of the entire projection optical system (OP1), and therefore a large number of lens elements are required in the rear lens unit (GrR) to obtain sufficient optical performance as desired here. To ensure sufficient optical performance, the rear lens unit (GrR) needs to have, in a case where the entire projection optical system (OP1) is built as a zoom lens system, seven, or eight, or more constituent lens elements. Even in a case where the projection optical system (OP1) is built as a fixed-focal-length lens system, more than five constituent lens elements are required in the rear lens unit (GrR). If the upper limit of Condition (I) is exceeded, the optical power for which the rear lens unit (GrR) needs to be responsible is reduced, and thus it is possible to minimize the number of the constituent lens elements of the rear lens unit (GrR). In this case, however, to keep the projection optical system (OP1) telecentric, the rear lens unit (GrR) needs to have an unduly long total length and an unduly large aperture diameter, and accordingly, the front lens unit (GrF) needs to have an extremely large diameter.

Moreover, in order to keep sufficient optical performance in the projection optical system (OP1), it is preferable that the focal length and the F number of the entire projection optical system (OP1), and the aperture diameter fulfill Condition (II) below.

$$0.2<FL/(FNO \times D)<0.8 \qquad (II)$$

where

FL represents the focal length of the entire projection optical system (OP1) (i.e., in a case where the projection optical system (OP1) is a zoom lens system, the shortest focal length);

FNO represents the F number; and

D represents the aperture diameter (i.e. the diameter of the aperture stop (A)).

In cases where the projection optical system (OP1) has a wide angle of view, if the upper limit of Condition (II) is exceeded, it is impossible to keep the projection optical system (OP1) telecentric and thus secure a sufficiently long back focal length. As a result, it is impossible to dispose the color separating/integrating prism (Pr1) in the projection optical system (OP1). If the lower limit of Condition (II) is exceeded, the rear lens unit (GrR) needs to have an unduly long total length, and accordingly, the front lens unit (GrF) has an unduly large diameter.

Second Embodiment (FIG. 3)

The projector optical system of the second embodiment is designed for use in an image projection apparatus of a backward-projection type (rear type), and has, like that of the first embodiment, an illumination optical system for illuminating reflection-type display panels (PR, PG, and PB) and a projection optical system (OP1) for projecting the images displayed on those reflection-type display panels (PR, PG, and PB) onto a screen (S). Although FIG. 3 does not show the illumination relay optical system (OP2), the light source (1), the reflector (2), and the integrator (3), illumination is achieved in the same way in the second embodiment as in the first embodiment. The projector optical system of this embodiment has basically the same basic structure as that of the first embodiment, except that, here, the projection optical system (OP1) is built as a wide-angle fixed-focal-length lens system. Accordingly, no further description will be given as to the projector optical system of this embodiment.

EXAMPLES

Hereinafter, examples of the projector optical systems embodying the present invention will be presented with reference to their construction data, graphic representations of aberrations, and other data. Table 1 lists the construction data of the projection optical system (OP1) of Example 1, Table 2 lists the construction data of the illumination relay optical system (OP2) of Example 1, and Table 3 lists the construction data of the projection optical system (OP1) of Example 2. These Examples 1 and 2 respectively correspond to the first and second embodiments described above and have optical compositions as shown in FIGS. 1 and 3.

In the construction data of the projection optical system (OP1) of the examples, ri (i=1, 2, 3, . . . ) represents the radius of curvature of the ith surface counted from the enlargement side (i.e. the screen (S) side), and di (i=1, 2, 3, . . . ) represents the ith axial distance (dS represents the distance between the screen (S) and the screen (S)-side end surface of the projection optical system (OP1), dA represents the distance between the aperture stop (A) and the aperture (A)-side end surface of the rear lens unit (GrR)) counted from the enlargement side. Ni (i=1, 2, 3, . . . ) and vi (i=1, 2, 3, . . . ) represent the refractive index (Nd) and the Abbe number (vd), respectively, for d-line of the ith optical element counted from the enlargement side. Moreover, in the construction data, for each of the axial distances that vary with zooming (i.e. the variable axial distances), two values are given that are, from left, the axial aerial distance between the lens units at the telephoto end [T] (i.e. in the longest focal length condition), and the same distance at the wide-angle end [W] (i.e. in the shortest focal length condition). Also listed are the focal lengths FL and the F-numbers FNO (Ymax represents the maximum image height) of the entire projection optical system (OP1) in these two focal-length conditions, the values corresponding to the relevant conditions, and other data.

In addition, in the construction data of the illumination relay optical system (OP2), ri (i=1, 2, 3, . . . ) represents the radius of curvature of the ith surface counted from the integrator (3) side, and di (i=1, 2, 3, . . . ) represents the ith axial distance counted from the integrator (3) side (dI represents the distance between the second lens array (3b) of the integrator (3) and the surface (r1) of the illumination relay optical system (OP2) that is closest to the second lens array (3b)). Ni (i=1, 2, 3, . . . ) and vi (i=1, 2, 3, . . . ) represent the refractive index (Nd) and the Abbe number (vd), respectively, for d-line of the ith optical element counted from the integrator (3) side.

Furthermore, a surface whose radius of curvature ri is marked with an asterisk (*) is an aspherical surface, whose surface shape is defined by Formula (AS) below. Also listed together with the construction data are the aspherical coefficients of each aspherical surface and other data.

$$X=(C\cdot Y^2)/\{1+\sqrt{(1-\epsilon\cdot C^2\cdot Y^2)}\}+\Sigma(A_i\cdot Y^i) \quad (AS)$$

where

X represents the displacement from the reference surface in the optical axis (AX) direction;

Y represents the height in a direction perpendicular to the optical axis (AX);

C represents the paraxial curvature;

$\epsilon$ represents the quadric surface parameter; and

Ai represents the aspherical coefficient of the ith order.

Figure 2A:
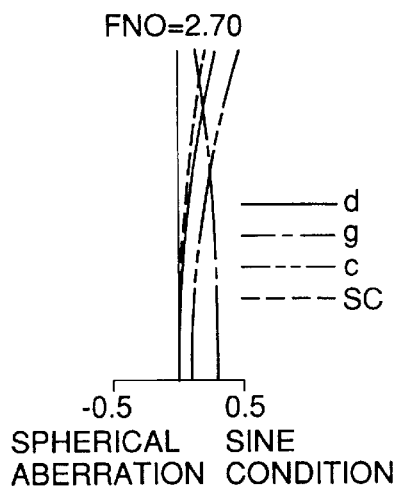
FIGS. 2A to 2F are graphic representations of the aberrations observed in the projector optical system of Example 1.
Figure 2B:
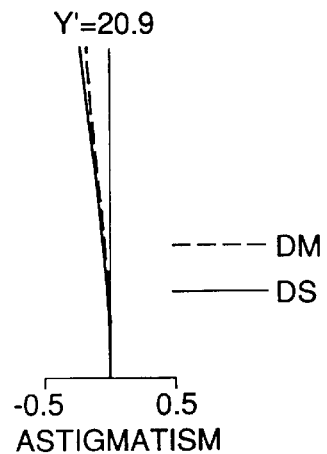
Figure 2C:
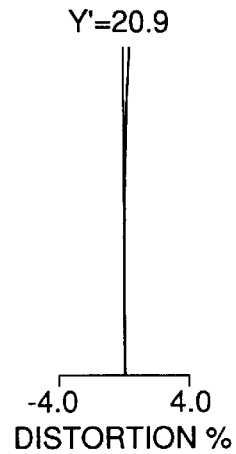
Figure 2D:
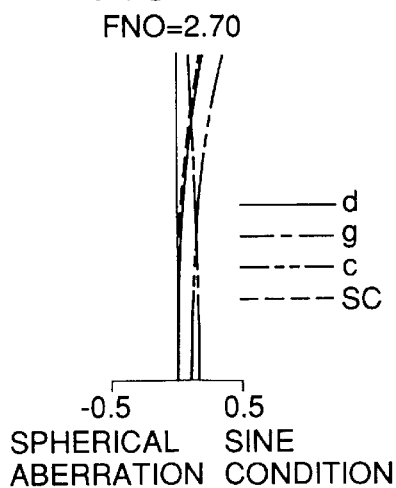
Figure 2E:
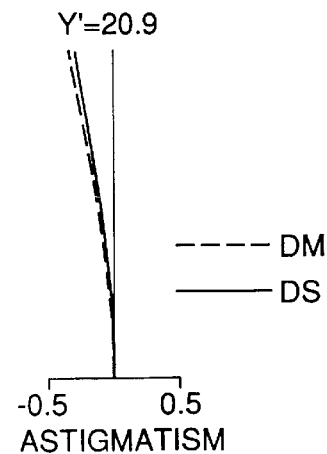
Figure 2F:
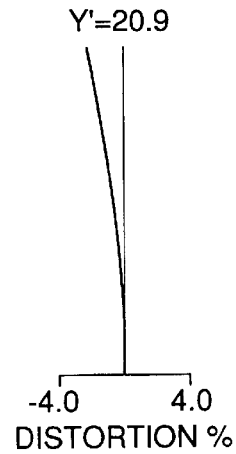
Figure 4A:
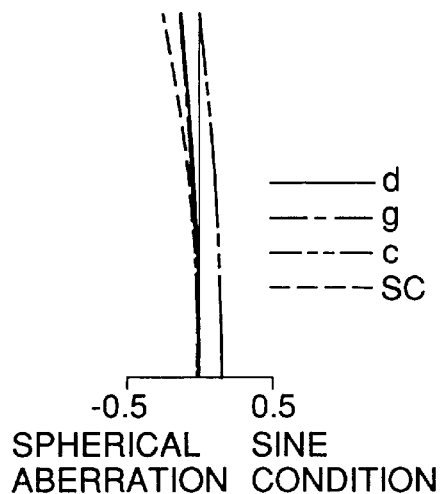
FIGS. 4A to 4C are graphic representations of the aberrations observed in the projector optical system of Example 2.
Figure 4B:
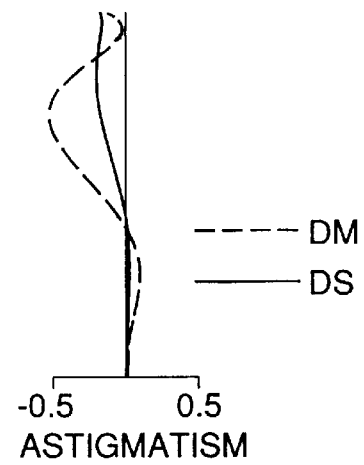
Figure 4C:
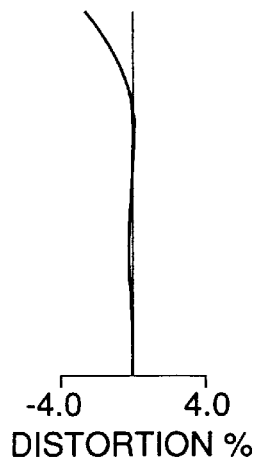

FIGS. 2A to 2F are graphic representations of the aberrations observed at the reduction side in Example 1. Of these diagrams, FIGS. 2A to 2C show the aberrations observed at the telephoto end [T], and FIGS. 2D to 2F show the aberrations observed at the wide-angle end [W]. FIGS. 4A to 4C are graphic representations of the aberrations observed at the reduction side in Example 2. Of all the above diagrams, FIGS. 2A, 2D, and 4A show spherical aberration and sine condition; FIGS. 2B, 2E, and 4B show astigmatism; and FIGS. 2C, 2F, and 4C show distortion (Y': image height). In the spherical aberration diagrams, the solid line (d) represents the aberration for d-line, the dash-and-dot line represents the aberration for g-line, the dash-dot-dot line represents the aberration for c-line, and the broken line (SC) represents the sine condition. In the astigmatism diagrams, the broken line (DM) and the solid line (DS) represent the astigmatism for d-line on the meridional plane and on the sagittal plane, respectively. In the distortion diagrams, the solid line represents the distortion (in %) for d-line. Note that, in practical use, the projection optical system has the image plane on the screen (S) and has the object plane on the surfaces of the reflection-type display panels (PR, PG, and PB). However, in the above examples, the projection optical system is regarded as a reduction system having the object plane on the screen (S), and its optical performance is evaluated on the reflection-type display panels (PR, PG, and PB).

As described heretofore, according to the present invention, it is possible to realize a projector optical system that offers satisfactory optical performance and nevertheless has a rear lens unit composed of as few constituent lens elements as possible. By the use of such a projector optical system, it is possible to achieve high-quality image projection with a minimal number of lens elements and prevent, by the reduction of the number of lens elements, deterioration of the projection contrast.

TABLE 1

<<Construction Data of Projection Optical System (OP1) of Example 1>>

FL = 77.0~55.0
FNO = 2.7~2.7
Ymax = 20.9
$\phi$F = 0.0104792~0.0146709
$\phi$ = 1/FL = 0.0129870~0.0181818
D = 28.892
Condition (I): $\phi$F/$\phi$ = 0.807~0.807
Condition (II): FL/(FNO × D) = 0.987~0.705

| Radius of Curvature | Axial Distance | Refractive Index | Abbe Number |
|---|---|---|---|
| {Screen (S)} | | | |
| | dS = 3000.00 | | |
| <Front Lens Unit (GrF)> | | | |
| <First Lens Unit (Gr1)> | | | |
| r1 = 154.1673 | d1 = 4.00 | N1 = 1.69680 | v1 = 56.47 |
| r2 = 67.1944 | d2 = 13.00 | | |
| r3 = 234.1997 | d3 = 4.00 | N2 = 1.69680 | v2 = 56.47 |
| r4 = 105.2300 | d4 = 19.00 | | |
| r5 = −82.3160 | d5 = 9.00 | N3 = 1.70055 | v3 = 30.11 |
| r6 = −85.6898 | d6 = 6.75~48.68 | | |
| <Second Lens Unit (Gr2)> | | | |
| r7 = −80.9363 | d7 = 4.00 | N4 = 1.84666 | v4 = 23.82 |
| r8 = −499.4780 | d8 = 10.00 | N5 = 1.62041 | v5 = 60.29 |
| r9 = −84.7652 | d9 = 0.30 | | |
| r10 = 174.3083 | d10 = 12.00 | N6 = 1.69680 | v6 = 56.47 |
| r11 = −147.1164 | d11 = 0.30 | | |
| r12 = 73.7980 | d12 = 10.00 | N7 = 1.69680 | v7 = 56.47 |

TABLE 1-continued

<<Construction Data of Projection Optical System (OP1) of Example 1>>

FL = 77.0~55.0
FNO = 2.7~2.7
Ymax = 20.9
φF = 0.0104792~0.0146709
φ = 1/FL = 0.0129870~0.0181818
D = 28.892
Condition (I): φF/φ = 0.807~0.807
Condition (II): FL/(FNO × D) = 0.987~0.705

| Radius of Curvature | Axial Distance | Refractive Index | Abbe Number |
|---|---|---|---|
| r13 = 332.9881 | d13 = 17.00~4.76 | | |
| <Third Lens Unit (Gr3)> | | | |
| r14 = −284.6594 | d14 = 6.00 | N8 = 1.51823 | ν8 = 58.96 |
| r15 = 130.8368 | d15 = 3.00 | | |
| r16 = 55.6344 | d16 = 8.00 | N9 = 1.77551 | ν9 = 37.90 |
| r17 = −503.2890 | d17 = 3.00 | N10 = 1.51680 | ν10 = 64.20 |
| r18 = 37.5399 | d18 = 4.00~5.00 | | |
| {Aperture Stop (A)} | | | |
| | dA = 40.00{Reflection Mirror (M)} | | |
| <Rear Lens Unit (GrR), Color Separating/Integrating Prism (Pr1)> | | | |
| r19 = −34.7289 | d19 = 4.00 | N11 = 1.80518 | ν11 = 25.43 |
| r20 = 100.3798 | d20 = 16.00 | N12 = 1.62041 | ν12 = 60.29 |
| r21 = −49.8925 | d21 = 0.30 | | |
| r22 = 394.3544 | d22 = 9.00 | N13 = 1.62041 | ν13 = 60.29 |
| r23 = −107.4446 | d23 = 0.30 | | |
| r24 = 76.4736 | d24 = 10.00 | N14 = 1.62041 | ν14 = 60.29 |
| r25 = ∞ | (Pr1) . . . d25 = 39.20 | N15 = 1.51680 | ν15 = 64.20 |
| r26 = ∞ | d26 = 13.570 | | |
| {Reflection-type Display Panels (PR, PG, and PB)} | | | |

TABLE 2

<<Construction Data of Illumination Relay Optical System (OP2) of Example 1>>

| Radius of Curvature | Axial Distance | Refractive Index | Abbe Number |
|---|---|---|---|
| {Second Lens Array (3b) . . . Light Source Image formed by Integrator} | | | |
| | dI = 3.00 | | |
| r1 = 108.6957 | d1 = 15.00 | N1 = 1.51680 | ν1 = 64.20 |
| r2 = ∞ | d2 = 149.00 | | |
| r3 = 47.0144 | d3 = 11.00 | N2 = 1.71300 | ν2 = 53.93 |
| r4 = 350.5512 | d4 = 13.00 | | |
| r5 = 46.9059 | d5 = 3.00 | N3 = 1.61293 | ν3 = 36.96 |
| r6 = 27.0270 | d6 = 66.00 | | |
| r7 = −1086.0240 | d7 = 12.00 | N4 = 1.80518 | ν4 = 25.43 |
| r8 = −70.3888 | d8 = 0.30 | | |
| r9 = 61.6090 | d9 = 12.00 | N5 = 1.80518 | ν5 = 25.43 |
| r10 = 417.5644 | d10 = 36.00 | | |
| {Aperture Stop (A) of Projection Optical System (OP1)} | | | |

TABLE 3

<<Construction Data of Projection Optical System (OP1) of Example 2>>

FL = 28.0
FNO = 2.5
Ymax = 20.9
φF = 0.0136705
φ = 1/FL = 0.0356567
D = 30.405

Condition (I): $\phi F/\phi = 0.468$
Condition (II): $FL/(FNO \times D) = 0.342$

| Radius of Curvature | Axial Distance | Refractive Index | Abbe Number |
|---|---|---|---|
| {Screen (S)} | | | |
| | dS = 845.00 | | |
| <Front Lens Unit (GrF)> | | | |
| r1 = 57.1109 | d1 = 3.00 | N1 = 1.49140 | ν1 = 57.82 |
| r2 = 25.9317 | d2 = 22.66 | | |
| r3 = −104.9360 | d3 = 3.00 | N2 = 1.76241 | ν2 = 49.45 |
| r4 = 55.2563 | d4 = 13.62 | | |
| r5 = 27917.5984 | d5 = 9.99 | N3 = 1.68878 | ν3 = 26.76 |
| r6 = −99.7675 | d6 = 27.26 | | |
| r7 = 157.4126 | d7 = 10.90 | N4 = 1.49576 | ν4 = 69.23 |
| r8 = −104.6019 | d8 = 33.10 | | |
| r9 = 95.0227 | d9 = 7.03 | N5 = 1.48847 | ν5 = 70.28 |
| r10 = −957.8819 | d10 = 1.11 | | |
| {Aperture Stop (A)} | | | |
| | dA = 40.38 {Reflection Mirror (M)} | | |
| <Rear Lens Unit (GrR)> | | | |
| r11 = 420.0516 | d11 = 4.94 | N6 = 1.83350 | ν6 = 21.00 |
| r12 = 56.5979 | d12 = 4.01 | | |
| r13 = 138.5886 | d13 = 8.49 | N7 = 1.73521 | ν7 = 52.24 |
| r14 = −103.2509 | d14 = 14.31 | | |
| r15 = 53.0391 | d15 = 18.59 | N8 = 1.48750 | ν8 = 70.44 |
| r16 = −169.8101 | d16 = 5.93 | | |
| <Color Separating/Integrating Prism (Pr1)> | | | |
| r17 = ∞ | d17 = 42.00 | N9 = 1.51680 | ν9 = 64.20 |
| r18 = ∞ | d18 = 10.00 | | |

{Reflection-type Display Panels (PR, PG, and PB)}
[Aspherical Coefficients of 2nd Surface (r2)]
$\epsilon = 0.07559$
$A4 = 3.59196 \times 10^{-6}$
$A6 = -3.01941 \times 10^{-9}$
$A8 = 2.66352 \times 10^{-12}$
$A10 = 3.13873 \times 10^{-15}$
$A12 = -4.65878 \times 10^{-18}$

What is claimed is:

1. A projector optical system comprising:
a reflection-type display panel;
an illumination optical system for illuminating the reflection-type display panel;
a projection optical system for projecting images displayed on the reflection-type display panel onto a screen, the prolection optical system including, from a screen side:
a front lens unit;
a rear lens unit;
a light-deriving means for directing illumination light toward the reflection-type display panel, the light-deriving means being disposed between the front and rear lens units; and
an aperture stop between the front and rear lens units, and
wherein the following conditions are fulfilled:

$$0.2 < \varphi F/\varphi < 0.9 \quad \text{and}$$

$$0.2 < FL/(FNO \times D) < 0.8$$

where
φF represents an optical power of the front lens unit of the projection optical system;
φ represents an optical power of the entire projection optical system;
FL represents a shortest focal length of the entire projection optical system;
FNO represents an F number; and
D represents an aperture diameter.

2. A projector optical system as claimed in claim 1, wherein the projection optical system is a telecentric optical system.

3. A projector optical system as claimed in claim 1, wherein the illumination optical system has an integrator for forming a plurality of light source images, and further has an illumination relay optical system for forming, through the light-deriving means, images conjugate with the light source images within the projection optical system.

4. A projector optical system as claimed in claim 1, wherein the projection optical system has an aperture stop between the front and rear lens units, and further has a reflection mirror, serving as the light-deriving means, that is disposed near the aperture stop so as to cover about a half of an aperture diameter.

5. A projector optical system as claimed in claim 1, wherein the projector optical system has three reflection-type displays in accordance with red, green, and blue light, and a light separating/integrating prism.

6. A projector optical system as claimed in claim 1, wherein the illumination optical system has an integrator including two lens arrays.

7. A projector optical system as claimed in claim 1, wherein the projection optical system is built as a zoom lens system, and zooming is performed by moving only the front lens unit.

8. A projector optical system as claimed in claim 1, wherein focusing is performed by moving a portion of the front lens unit.

9. A projector optical system comprising:
a reflection-type display panel;
an illumination optical system for illuminating the reflection-type display panel;
a projection optical system for protecting images displayed on the reflection-type display panel onto a screen, the projection optical system including, from a screen side,
a front lens unit;
a rear lens unit; and
a light-deriving means for directing illumination light toward the reflection-type display panel, the light-deriving means being disposed between the front and rear lens units, wherein the following condition is fulfilled, $$0.2 < \phi F/\phi < 0.9$$

where $\phi F$ represents an optical power of the front lens unit of the projection optical system; and $\phi$ represents an optical power of the entire projection optical system, and wherein the projection optical system is built as a zoom lens system, and zooming is performed by moving only the front lens unit.

10. A projector optical system as claimed in claim 9, wherein the projection optical system is a telecentric optical system.

11. A projector optical system as claimed in claim 9, wherein the projection optical system has an aperture stop between the front and rear lens units, and wherein the following condition is fulfilled:

$$0.2 < FL/(FNO \times D) < 0.8$$

where

FL represents a focal length of the entire projection optical system (i.e., in a case where the projection optical system is built as a zoom lens system, the shortest focal length);

FNO represents an F number; and

D represents an aperture diameter.

12. A projector optical system as claimed in claim 9, wherein the illumination optical system has an integrator for forming a plurality of light source images, and further has an illumination relay optical system for forming, through the light-deriving means, images conjugate with the light source images within the projection optical system.

13. A projector optical system as claimed in claim 9, wherein the projection optical system has an aperture stop between the front and rear lens units, and further has a reflection mirror, serving as the light-deriving means, that is disposed near the aperture stop so as to cover about a half of an aperture diameter.

14. A projector optical system as claimed in claim 9, wherein focusing is performed by moving a portion of the front lens unit.

15. A projector optical system as claimed in claim 9, wherein the projector optical system has three reflection-type displays in accordance with red, green, and blue light, and a light separating/integrating prism.

16. A projector optical system as claimed in claim 9, wherein the illumination optical system has an integrator including two lens arrays.

17. A projector optical system comprising:
a reflection-type display panel;
an illumination optical system for illuminating the reflection-type display panel;
a projection optical system for projecting images displayed on the reflection-type display panel onto a screen, the projection optical system including, from a screen side:
a front lens unit;
a rear lens unit; and
a light-deriving means for directing illumination light toward the reflection-type display panel, the light-deriving means being disposed between the front and rear lens units, wherein the following condition is fulfilled:

$$0.2 < \phi F/\phi < 0.9$$

where $\phi F$ represents an optical power of the front lens unit of the protection optical system; and $\phi$ represents an optical power of the entire projection optical system, and wherein focusing is performed by moving a portion of the front lens unit.

18. A projector optical system as claimed in claim 17, wherein the projection optical system is a telecentric optical system.

19. A projector optical system as claimed in claim 17, wherein the projection optical system has an aperture stop between the front and rear lens units, and wherein the following condition is fulfilled:

$$0.2 < FL/(FNO \times D) < 0.8$$

where

FL represents a focal length of the entire projection optical system (i.e., in a case where the projection optical system is built as a zoom lens system, the shortest focal length);

FNO represents an F number; and

D represents an aperture diameter.

20. A projector optical system as claimed in claim 17, wherein the illumination optical system has an integrator for forming a plurality of light source images, and further has an illumination relay optical system for forming, through the light-deriving means, images conjugate with the light source images within the projection optical system.

21. A projector optical system as claimed in claim 17, wherein the projection optical system has an aperture stop between the front and rear lens units, and further has a reflection mirror, serving as the light-deriving means, that is disposed near the aperture stop so as to cover about a half of an aperture diameter.

22. A projector optical system as claimed in claim 17, wherein the projection optical system is built as a zoom lens system, and zooming is performed by moving only the front lens unit.

23. A projector optical system as claimed in claim 17, wherein the projector optical system has three reflection-type displays in accordance with red, green, and blue light, and a light separating/integrating prism.

24. A projector optical system as claimed in claim 17, wherein the illumination optical system has an integrator including two lens arrays.

25. A projection optical system for projecting images displayed on a reflection-type display panel onto a screen, comprising, from the screen side:

a front lens unit;

a rear lens unit; and a light-deriving means for directing illumination light toward the reflection-type display, the light-deriving means being disposed between the front and rear lens units, wherein the following conditions are fulfilled:

$$0.2 < \varphi F/\varphi < 0.9 \quad \text{and}$$

$$0.2 < FL/(FNO \times D) < 0.8$$

where

φF represents an optical power of the front lens unit of the projection optical system;

φ represents an optical power of the entire projection optical system;

FL represents a shortest focal length of the entire projection optical system;

FNO represents an F number; and

D represents an aperture diameter.

26. A projection optical system as claimed in claim 25, wherein the projection optical system is a telecentric optical system.

27. A projection optical system as claimed in claim 25, wherein the projection optical system has an aperture stop between the front and rear lens units, and further has a reflection mirror, serving as the light-deriving means, that is disposed near the aperture stop so as to cover about a half of an aperture diameter.

28. A projection optical system as claimed in claim 25, wherein the projection optical system is built as a zoom lens system, and zooming is performed by moving only the front lens unit.

29. A projection optical system as claimed in claim 25, wherein focusing is performed by moving a portion of the front lens unit.

* * * * *